United States Patent [19]

Musgrove

[11] Patent Number: 4,474,345

[45] Date of Patent: Oct. 2, 1984

[54] TANDEM FAN SERIES FLOW VSTOL PROPULSION SYSTEM

[75] Inventor: Robert G. Musgrove, Arlington, Tex.

[73] Assignee: LTV Aerospace and Defence Company, Dallas, Tex.

[21] Appl. No.: 403,678

[22] Filed: Jul. 30, 1982

[51] Int. Cl.$^3$ ............................................. B64D 27/14
[52] U.S. Cl. ............................... 244/53 R; 244/23 B; 244/23 D; 244/12.5; 244/53 B; 60/230
[58] Field of Search .................. 244/53 R, 53 B, 12.5, 244/12.3, 23 B, 23 D; 60/226 R, 226 B, 228, 230

[56] References Cited

U.S. PATENT DOCUMENTS

| | | | |
|---|---|---|---|
| 2,912,188 | 11/1959 | Singelmann et al. | 244/12 |
| 3,248,877 | 5/1966 | Alderson et al. | 244/12.5 |
| 3,299,638 | 1/1967 | Santamaria et al. | 60/230 |
| 3,488,018 | 1/1970 | Johnson | 244/12 |
| 3,700,189 | 10/1972 | Timperman | 244/12 |
| 3,900,177 | 8/1975 | Calder et al. | 244/53 B |
| 4,038,818 | 8/1977 | Snell | 60/226 R |
| 4,175,384 | 11/1979 | Wagenknecht et al. | 60/226 B |
| 4,222,234 | 9/1980 | Adamson | 244/23 D |

OTHER PUBLICATIONS

Impact of Emission Requirements on V/STOL Propulsion Concept Selection, W. R. Boruff and A. J. Roch, Jr.
Concept Definite and Aerodynamic Technology Studies for Single Engine V/STOL Fighter/Attack Aircraft, W. P. Nelms and D. A. Durston.
New Engine Cycles/Opportunity for Creativity, Walter C. Swan and G. J. Schott.

Primary Examiner—Trygve M. Blix
Assistant Examiner—Ivy M. Shum
Attorney, Agent, or Firm—James M. Cate; S. S. Sadacca

[57] ABSTRACT

A propulsion system for vertical take off and landing aircraft includes a forward compressor fan (40) and an aft compressor fan (42) downstream of the forward fan and in series flow communication with the forward fan. The forward and aft fans are positioned in a central duct (26). A gas turbine engine (44) is in series flow with the forward and aft fans for driving the fans. The forward fan, aft fan and turbine engine are interconnected by a common shaft (50). A forward diverter structure (100) is positioned downstream of the forward fan and is movable between a first position for diverting exhaust from the forward fan downwardly relative to the longitudinal axis of the aircraft while simultaneously permitting the introduction of air behind the forward diverter structure but ahead of the aft fan and a second position wherein the exhaust from the forward fan is channeled through the aft fan and turbine. An aft diverter (160) is positioned downstream of the aft fan and is movable between a first position wherein the diverter directs exhaust from the aft fan downwardly relative to the longitudinal axis of the aircraft and a second position wherein the exhaust is directed longitudinally from the aircraft.

5 Claims, 6 Drawing Figures

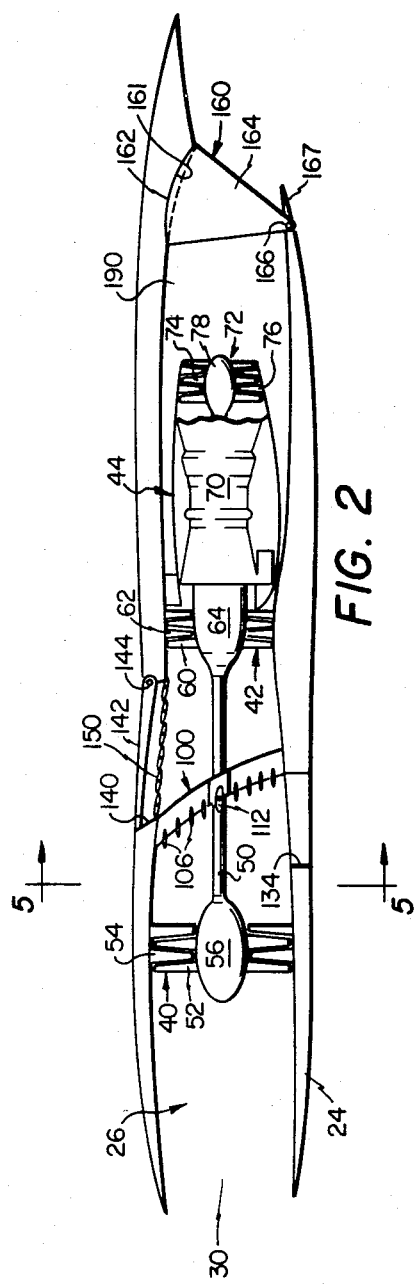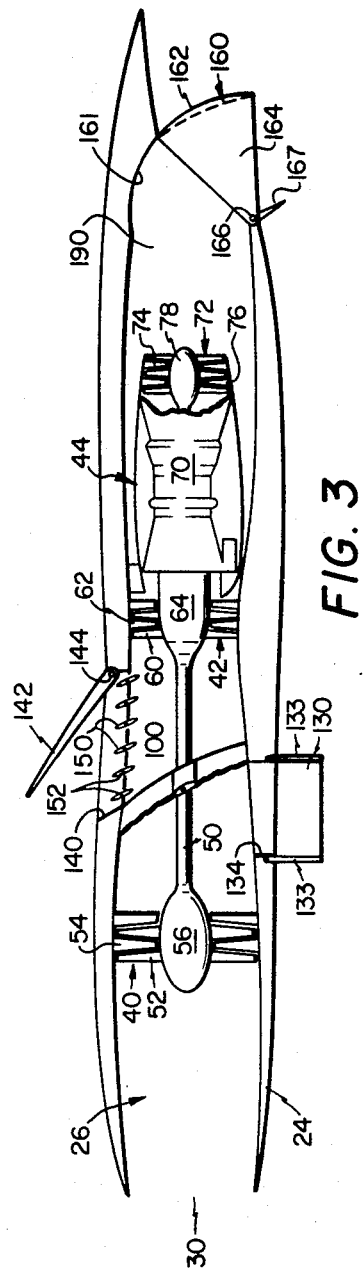

TANDEM FAN SERIES FLOW VSTOL PROPULSION SYSTEM

TECHNICAL FIELD

The present invention relates to a propulsion system for vertical and short take off and landing (VSTOL) aircraft and more specifically to a propulsion system using tandem fans in series with a gas turbine engine in VSTOL aircraft.

BACKGROUND ART

One of the major challenges facing the VSTOL aircraft designer has been to design a propulsion system which would yield vertical thrust centered about the aircraft longitudinal center of gravity while still allowing the pilot to be located up front for good visibility, the engine to be aft of the center of gravity for longitudinal weight balance and the engine to exhaust directly aft without impinging on the airframe. Horizontal hover balance cannot be achieved by simple downward deflection of the thrust from an aft located engine. A nose down pitching moment results and must be balanced by a downward thrust forward of the aircraft center of gravity.

Some proposed methods of of supplying this forward balancing thrust are the use of vertically thrusting lift engines or lift fans which are stowed during horizontal flight and thus add nothing to the cruise performance of the aircraft. These lift engines or lift fans must be either redundant or interconnected with the main engines to prevent pitch imbalance in the event of an engine failure. In the case of the lift engines, multiple engines have been utilized to achieve redundancy. With fans and propellers, hot gas ducting or gears and shafts are used to drive them and thus provide the necessary interconnect. Because the lift fans are stowed in flight, these interconnects must be broken for cruise and reengaged for landing. Thus, large horsepower clutches or hot gas diverters are required.

An aircraft currently in production that can be used as an example of the prior art is the AV-8A Harrier VTOL aircraft. The Harrier utilizes a fan jet engine located approximately at the aircraft center of gravity for both hover and cruise propulsion. The fan air is collected and discharged forward of the center of gravity and the jet thrust is discharged aft of the center of gravity. The exhaust gases are discharged through swivel nozzles out of both sides of the engine either down for vertical lift or aft for cruise. The fan air thrust balances the jet thrust about the aircraft center of gravity in hover. Because the engine is located on the center of gravity, aircraft structure and equipment must be located aft of the engine to balance the pilot compartment forward of the engine. Afterburning with this configuration has proven difficult because it must be achieved inside the swivel nozzle. The fan air and the turbine exhaust gases are maintained in separate flow paths through all modes of flight.

U.S. Pat. No. 2,912,188 to D. E. Singelmann, et al., issued Nov. 10, 1959 also discloses a VTOL aircraft using a tiltable combustion chamber which permits thrust to be directed downwardly for vertical take off and loading. However, for cruise flight, these tiltable chambers are rotated aft but the thrust is discharged separately from that produced aft of the center of gravity of the craft through separate turbines. This structure is complex and does not permit the reduction of the frontal area of the craft as is provided in the present invention.

DISCLOSURE OF THE INVENTION

The present propulsion system consists of two or more fans which are coaxially mounted on a shaft driven by a gas tubine which is itself coaxial to the shaft. The fans share a common duct and are separated by a distance sufficient to house an air flow diverter and downward exhausting nozzle in the duct and provide an air flow intake for the aft fan. The gas turbine includes a driving turbine which can be positioned at several locations on the shaft but preferably located behind the aft fan. The turbine can be driven by a single gas generator that is coaxial with the turbine or by several gas generators clustered around the turbine shaft or at a remote location.

The system provides the required forward balance thrust without the need for highly loaded right angle gears or clutches, while still allowing the engine to be located on the aft side of the aircraft center of gravity. This improves weight balance and permits direct aft exhaust without impingement on the airframe. Further, all thrust producing equipment used for hover flight is utilized for cruise flight even though the system does not incorporate clutches or other engaging devices. The system provides for smooth transition from vertical lift to forward thrust by vectoring the nozzles from the vertical direction aft toward a horizontal position. This same system feature provides for short take off by vectoring the nozzles to an angle between vertical and horizontal that will provide the proper longitudinal thrust, as well as the desired vertical thrust.

In one embodiment of the invention, the propulsion system includes forward and aft compressor fans located in a common duct. The aft compressor fan is positioned downstream of and in series flow communication with the forward fan. A drive turbine is positioned in the duct downstream of the aft fan and is also in series flow with the forward and rear fans. The forward fan, aft fan and gas turbine are interconnected by a single shaft.

A first diverter is positioned downstream of the forward fan and has a first position for diverting fan exhaust produced by the forward fan downward relative to the longitudinal axis of the aircraft. An inlet is provided in the duct ahead of the aft fan for directing injection air to the aft fan when the flow through the foward fan is diverted downwardly for hover flight.

A second diverter is positioned downstream of the aft fan and in a first position diverts fan exhaust from the aft fan downwardly relative to the longitudinal axis of the aircraft. In its second position, the second diverter directs thrust longitudinally from the aircraft for cruise flight.

In one embodiment of the invention, the first diverter comprises a plurality of rotatable vanes operable between a first position wherein exhaust from the forward fan is directed downwardly and a second position wherein thrust from the fan is channeled to the aft fan.

In a further embodiment of the invention, variable guide vanes assoicated with each fan are controllable to modulate thrust levels between the forward and aft fans without changing thrust input from the turbine. In one embodiment of the invention, the turbine is driven by a gas generator positioned in series flow with the forward and aft fans. In an alternative embodiment, the gas generator includes a plurality of generators clustered around the drive turbine with exhaust from the generator ducted to the turbine.

The present propulsion system divides the fan area required for hover between two, or more, coaxial fans. With the fans positioned one behind the other within a common duct, during cruise flight, the frontal area presented is only that of one of the fans. Further, in cruise, the present propulsion system becomes a multi-stage ducted fan system. It is a multi-bypass ratio propulsion system with a higher bypass ratio for hover than for cruise. The system also operates at a pressure ratio of each of the fans in hover and at a multiple of the pressure ratio of several stages during cruise. The higher bypass ratio (lower pressure ratio) in hover provides a more economical hover efficiency similar to a helicopter. The lower bypass ratio (higher pressure ratio) in cruise provides performance similar to turbojet systems preferred for supersonic flight.

Fan air from the forward fan is directed by the first diverter forward of the center of gravity. Turbine exhaust gas, along with fan air from the rear fan, is discharged aft of the center of gravity to produce vertical thrust balance. In the cruise mode, the present propulsion system integrates the air from the forward fan with the air from the aft fan and mixes it with the turbine gas for discharge directly aft. Direct aft exhausting allows the use of conventional afterburner technology for supersonic flight. Air from all of the fans is mixed with the turbine gas in an afterburner section. Afterburning of the turbine gas and aft fan air is possible during hover or transition mode if desired. Afterburning of the forward fan is also possible by incorporating afterburners in the line of flow of the air directed downwardly by the first diverter associated with the forward fan.

BRIEF DESCRIPTION OF THE DRAWINGS

For a more complete understanding of the present invention, and for further details and advantages thereof, reference is now made to the following description taken in conjunction with the accompanying Drawings, in which:

FIG. 2 is a vertical section view of an aircraft with the propulsion system of the present invention operating in the cruise mode;

FIG. 3 is a vertical section view of an aircraft with the propulsion system of the present invention operating in the lifting or hovering mode;

DESCRIPTION OF THE PREFERRED EMBODIMENT

Figure 1:
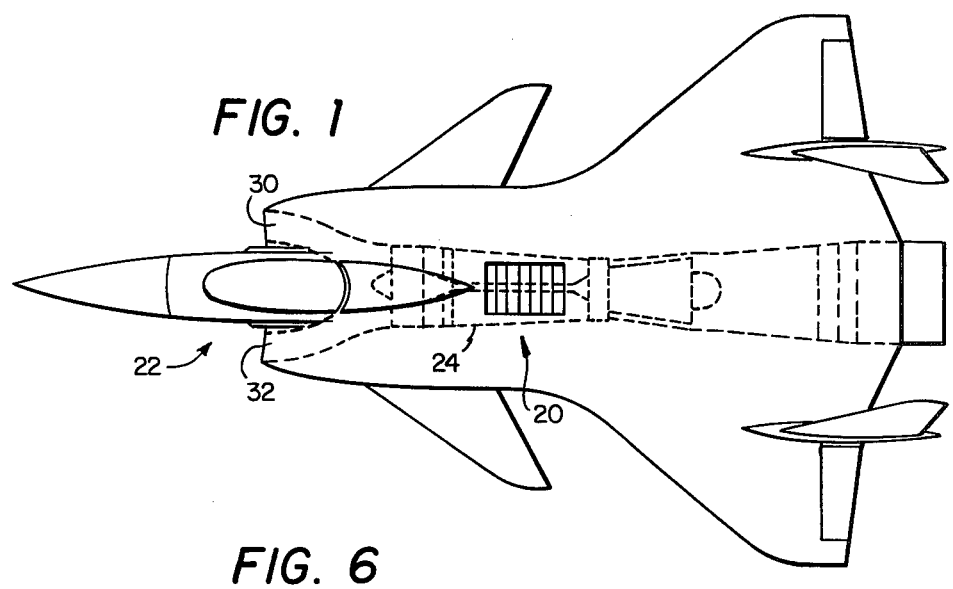
FIG. 1 is a top plan view of an aircraft embodying the present invention.

The present invention provides a propulsion system for VTOL aircraft which produces longitudinal thrust balance during hover, as well as efficient thrust for cruise flight. Referring to FIG. 1 of the drawings, the present propulsion system 20 is incorporated in an aircraft 22. The propulsion system is located in the fuselage 24 within a central duct 26 which incorporates the longitudinal or roll axis of the aircraft. Air inlets 30 and 32 channel air into central duct 26.

Referring now to FIG. 2 in conjunction with FIG. 1, propulsion system 20 includes a forward fan compressor 40, an aft compressor fan 42 downstream of forward fan 40, and a gas turbine engine 44, downstream of aft fan 42. Forward fan 40, aft fan 42 and engine 44 are all positioned within central duct 26 and are interconnected by a common shaft 50.

Forward fan 40 includes a plurality of compressor stages 52 cooperating with a plurality of guide vanes 54 which are mounted from the inside wall of fuselage 24. Compressor stages 52 are mounted by way of a hub 56 to shaft 50. Similarly, aft compressor fan 42 includes a plurality of compressor stages 60 which cooperate with guide vanes 62 extending from the inside wall of duct 26. Compressor stages 60 are mounted from a hub 64 which rotates with shaft 50.

Engine 44 includes a gas generator 70 which drives a drive turbine 72 mounted on shaft 50. Drive turbine 72 includes stages consisting of blades 74 cooperating with stators 76. Turbine blades 74 are mounted to hub 78 on shaft 50. Alternatively, several gas generators may be clustered around the turbine shaft or at a remote location with their exhaust ducted to the drive turbine for driving fans 40 and 42.

Figure 6:
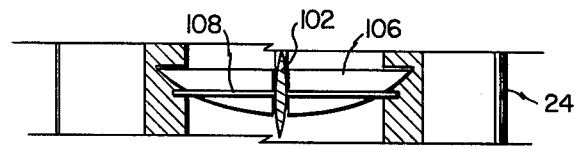
FIG. 6 is a section view taken along line 6—6 of FIG. 5.
Figure 4:
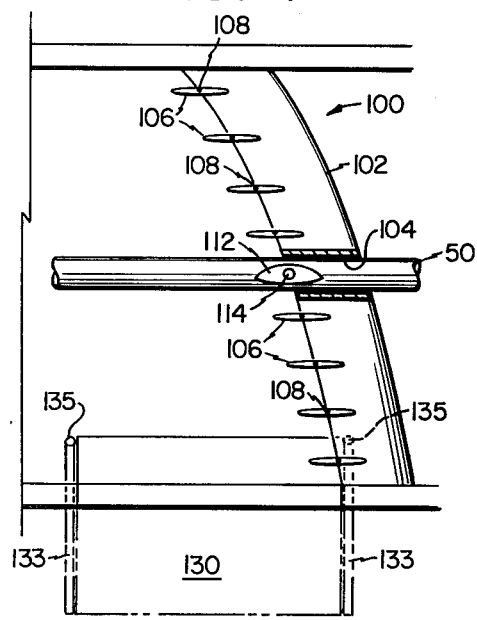
FIG. 4 is an enlargement of the forward diverter structure shown in FIG. 2.
Figure 5:
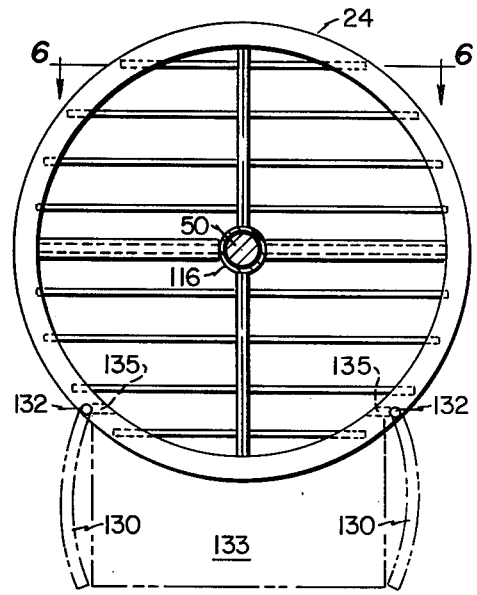
FIG. 5 is a section view taken along line 5—5 of FIG. 2.

A forward diverter structure 100 is shown in FIGS. 2 and 3 and in an enlarged view in FIG. 4. The diverter structure is aft of forward fan 40. Diverter 100 includes an air foil shaped support structure 102 mounted substantially vertically between the top and bottom of duct 26. The support structure includes a central sleeve 104 through which shaft 50 passes. A plurality of diverter vanes 106 is mounted with their axes substantially horizontal and includes a central shaft engaging duct 26 and about which the vanes rotate. Shafts 108 and vanes 106 are supported at their midpoint between the point of contact with duct 26 by support structure 102 as is shown in FIG. 5 and FIG. 6. The centermost vane 112 rotates on a shaft 114. The interior end of shaft 114 is journaled in a sleeve 116 (FIG. 5) which encircles shaft 50.

The interconnection of vanes 106 with vane 112 is accomplished using state of the art linkages. For example, vane 112 may be rotated by rotating its shaft 114 by way of a hydraulic or electric motor located outside duct 26. Vanes 106, both below and above vane 112, may be interconnected for simultaneous rotation with vane 112 by appropriate linkages located at the center of the span of the vanes. Shielding of such linkages may be provided by support structure 102. Because such interconnection to simultaneously rotate vanes 106 and 112 is well known to the art, such linkage is not shown in the drawings to avoid obscuring the structure shown.

As is seen in FIGS. 3, 4 and 5, fuselage 24 is adapted with lower doors 130 which open outwardly about axis shafts 132 and doors 133 which nest above doors 130 and open outwardly about shafts 135. As will be discussed hereinafter in greater detail, opening 134 provided in fuselage 24 by the opening of doors 130 and 133 permits exhaust from forward fan 40 to be directed downwardly ahead of the center of gravity of the aircraft. Doors 130 and 133 may be pivoted either by a control mechanism for rotating their respective shafts or by the use of a screw actuator connected between the fuselage structure and a point on the doors spaced from their axis shafts.

Referring now to FIG. 2, an air inlet 140 is provided in the upper wall of fuselage 24 immediately aft of forward diverter 100. A closure door 142 is pivotally mounted to fuselage 24 at shaft 144 and is movable from its closed position shown in FIG. 2 to the raised position shown in FIG. 3. A plurality of vans 150 is mounted immediately below closure door 142 on rotatable axes 152. As is seen in FIGS. 2 and 3, vanes 150 are operable between the closed position shown in FIG. 2 wherein the vanes close off air inlet 140 to the position shown in FIG. 3 wherein the vanes are rotated on their axis shafts to permit the flow of air through air inlet 140.

Vanes 150 may be controlled by structure similar to that described with respect to vanes 106. The shaft 152 of one of the vanes may be rotated by an appropriate motor, while the other vanes may be controlled by redundant linkages interconnecting the vanes one to the other. The control for door 42 may be by way of rotating shaft 144 or by the use of a screw actuator connected between the fuselage structure and a point on door 142 remote from shaft 144. Control of door 142 will be coordinated with the control of vanes 150 such that vanes 150 are in the position shown in FIG. 3 when door 142 is opened and vanes 150 are in the closed position shown in FIG. 2 when door 142 is closed.

An aft diverter 160 is mounted aft of drive turbine 72 and aft compressor fan 42 adjacent an exhaust nozzle 161. Diverter 160 includes a diverter shield 162 connected by side walls 164 to fuselage 24 at pivot point 166. A smaller vane 167 pivots with diverter 160 about point 166. As can be seen in FIGS. 2 and 3, aft diverter 160 may be moved from the position shown in FIG. 2 where exhaust is directed rearwardly from the aircraft through exhaust nozzle 161 to the position of FIG. 2 where exhaust is directed downwardly aft of the center of gravity of the aircraft.

Diverter 160 may be controlled by hydraulically or electrically operated screw jacks attached between the fuselage structure and side walls 164 of diverter 160. Smaller vane 167 is rotated with diverter 160 but is geared differently from diverter 160 such that it moves through a greater angle of movement than diverter 160 as is shown in FIGS. 2 and 3. In the cruise position shown in FIG. 2, smaller vane 167 forms a continuation of the lower portion of fuselage 24. In the hover or vertical lift off position, smaller vane 167 is rotated through a greater arc than diverter 160 to assume a position substantially parallel to diverter shield 162.

As is also shown in FIGS. 2 and 3, forward diverter 100 may be controlled to move vanes 106 and 112 from the horizontal position shown in FIG. 2 to the closed position shown in FIG. 3. In the position shown in FIG. 2, exhaust is directed from forward fan 40 to aft fan 42 and rearwardly through exhaust nozzle 161. In the position shown in FIG. 3, forward diverter 100 is closed to direct exhaust downwardly through opening 134 provided in the bottom of the fuselage through doors 130 and ahead of the center of gravity of the aircraft.

During vertical operations, the thrust from forward fan 40 is diverted downwardly by forward thrust diverter 100 through exhaust opening 134 created in the bottom of central duct 26 by the opening of doors 130. Simultaneously, air inlet 140 is opened by raising door 142 and orienting vanes 150 as shown in FIG. 3. Air inlet 140 is positioned in the top of the duct 26 behind forward thrust diverter 100 and supplies air to aft fan 42. Thrust from aft fan 42 is diverted downwardly by aft diverter 160 which forms a downwardly directed nozzle when in the position shown in FIG. 3. Gas turbine 44 is exhausted into the duct upstream of aft diverter 160 such that the residual thrust provided is utilized.

The thrust from all the vertical nozzles is positioned about the aircraft longitudinal center of gravity such that longitudinal balance is achieved. Pitch adjustment is achieved by extracting more thrust from the forward fan 40 and reducing the thrust extracted from aft fan 42 and from the residual thrust from gas tubine 44. Fan thrust adjustments can be achieved by either variable pitch fan blades or variable pitch entry guide vanes.

As is also shown in FIGS. 2 and 3, an afterburner section 190 is provided within central duct 26 aft of drive turbine 72. Similarly, an afterburner can be employed at exhaust opening 134.

The present system also readily provides for short take off by vectoring the exhaust through forward exhaust opening 134 and the exhaust through the aft nozzle 161 to an angle between vertical and horizontal that provides a component of longitudinal thrust, as well as vertical thrust. This is accomplished by controlling the position of doors 133 associated with opening 134 such that they are tilted slightly aft and by controlling the movement of aft diverter 160 such that the thrust directed by nozzle 161 provides a longitudinal thrust component, as well as a vertical component. The vectoring of thrust provided by the control permitted by the movement of doors 133 between a horizontal position and a slightly aft position, as well as by the vectoring of thrust by moving aft diverter 160 to an intermediate position, permits a very smooth transition between vertical lift, short take off maneuvers and cruise.

FIG. 2 illustrates the propulsion system in normal cruise operation. The central duct has a standard inlet 30 and exhaust nozzle 161 compatible with the propulsion requirements. In this arrangement, forward thrust diverter 100 is opened such that vanes 106 and 112 are aligned parallel to the longitudinal axis of the central duct. Air inlet 140 is closed as is exhaust opening 134 by the closing of doors 130. Thrust from forward fan 40 is directed through aft fan 42 and from central duct 26 through nozzle 161. The resulting system has a relatively low bypass ratio and a pressure ratio roughly equivalent to the product of that of the forward and aft fans. The nozzle 161 is designed to serve as a suitable cruise nozzle with aft diverter 160 in the raised position as shown in FIG. 2. As has been mentioned, an afterburner chamber 190 is provided immediately aft of gas turbine 44 and drive turbine 72. The afterburner can be employed during cruise or during a transition when additional thrust is required to produce a forward component, while maintaining an adequate lift thrust component.

The present arrangement in cruise flight provides an axial flow system. The arrangement allows mixing of the fan air with the turbine exhaust gases. As a result, the present arrangement lends itself to the use of any number of VTOL afterburner nozzle concepts. During vertical operations, lifting thrust is provided by the forward fan driven by the turbine engine mounted aft of the aft fan, thereby providing a relatively low temperature exhaust stream and reducing the level of temperature resistance that must be provided for the takeoff and landing surface.

The present propulsion system also employs all propulsion system components for all flight conditions using a gearless system which does not require the stowing of portions of the propulsion system in some flight modes. Moreover, in the cruise configuration, the arrangement of the present invention wherein both the forward and aft compressor fans are turbine engine are mounted in a common central duct in series, provides a configuration which is free from drag and interference provided by auxiliary inlets and exhaust nozzles or other impediments which could otherwise degrade high speed performance capabilities. The present invention also provides a low bypass ratio and a high pressure ratio for optimum efficiency at high speeds. The arrangement also provides a high static thrust because of its high bypass, low pressure ratio arrangement for vertical takeoff and landing.

Although preferred embodiments of the invention have been described in the foregoing Detailed Description and illustrated in the accompanying Drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the appended claims.

I claim:

1. A propulsion system for vertical and short take-off and landing aircraft comprising:
   a duct comprising therein,
   a forward compressor fan,
   an aft compressor fan controllably in series with the forward fan,
   a turbine means controllably in flow series with the forward and aft compressor fans,
   means interconnecting the forward compressor fan, aft compressor fan, and turbine means, a gas generator means for driving said turbine means,
   a first diverter means downstream of said forward fan for selectively diverting exhaust from the forward fan downwardly out of the duct, forward of the center of gravity of the aircraft, and
   a second diverter means downstream of said aft fan for selectively diverting exhaust from the aft fan downward, aft of the center of gravity of the aircraft,
   wherein said duct extends along the longitudinal axis of the aircraft and wherein said duct is substantially coaxial with the longitudinal axis of the aircraft.

2. A propulsion system for V/STOL aircraft comprising:
   a forward compressor fan,
   an aft compressor fan downstream of said forward fan and in series flow communication with said forward fan,
   a turbine means in series flow with said forward and aft fans for driving said fans, said forward fan, aft fan and turbine means being interconnected by a single shaft,
   a first diverter means downstream of said forward fan having a first position for diverting exhaust from the forward fan downwardly relative to the longitudinal axis of the aircraft while simultaneously permitting the introduction of air behind diverter means but ahead of said aft fan, and a second position wherein the exhaust from said forward fan is channeled through said aft fan and turbine, and
   a second diverter means downstream of said aft fan and having a first position wherein said second diverter means diverts exhaust from said aft fan downwardly relative to the longitudinal axis of the aircraft and a second position wherein said exhaust is directed longitudinally from the aircraft, wherein said forward and aft fans and said turbine means are positioned in a central duct extending along the longitudinal axis of the aircraft.

3. The propulsion system of claim 2 wherein said turbine means is aft of said aft fan.

4. The propulsion system according to claim 2 further comprising:
   variable guide vanes associated with each said fan, said vanes being controllable to modulate thrust levels between said forward and aft fans without changing thrust input from said turbine means.

5. A propulsion system for a V/STOL aircraft having an elongated body structure comprising:
   a forward compressor fan,
   an aft compressor fan downstream of said forward fan and in series flow communication with said forward fan,
   a turbine means in series flow with said forward and aft fans for driving said fans, said forward fan, aft fan and turbine means being interconnected by a single shaft,
   a first diverter means downstream of said forward fan hving a first position for diverting exhaust from said forward fan downwardly relative to the longitudinal axis of the elongated aircraft body structure while simultaneously permitting the introduction of air behind said diverter means but ahead of said aft fan, and a second position wherein the exhaust fan from said forward fan is channeled through said aft fans and turbine, and
   a second diverter means downstream of said aft fan having a first position wherein said second diverter means diverts exhaust from said aft fan downwardly relative to the longitudinal axis of the aircraft elongated body structure and a second position wherein said exhaust is directed longitudinally from the aircraft elongated body structure, wherein said forward and aft fans and said turbine means are positioned in a central duct extending along the longitudinal axis of the aircraft elongated body structure.

* * * * *